(12) United States Patent
Contreras Sosa et al.

(10) Patent No.: US 11,752,942 B2
(45) Date of Patent: Sep. 12, 2023

(54) VEHICLE BODY STRUCTURE MOUNTED SIDE VIEW MIRROR

(71) Applicant: Ford Global Technologies, LLC, Dearborn, MI (US)

(72) Inventors: Mario Contreras Sosa, Naucalpan (MX); Isaias Abner Garcia Vergara, Tlalpan (MX); Andrew Lee, Ann Arbor, MI (US); Cameron James Daniels, Allen Park, MI (US); Ted Victor Kolar, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 205 days.

(21) Appl. No.: 16/988,808

(22) Filed: Aug. 10, 2020

(65) Prior Publication Data
US 2022/0041109 A1 Feb. 10, 2022

(51) Int. Cl.
*B60R 1/07* (2006.01)
*B60R 1/078* (2006.01)
*B60R 1/12* (2006.01)

(52) U.S. Cl.
CPC ............ *B60R 1/07* (2013.01); *B60R 1/078* (2013.01); *B60R 1/1207* (2013.01)

(58) Field of Classification Search
CPC ............ B60R 1/07; B60R 1/074; B60R 1/078
USPC .................................................. 359/841, 877
See application file for complete search history.

(56) References Cited

U.S. PATENT DOCUMENTS

| 2,226,482 | A |   | 12/1940 | Sarnes |  |
|---|---|---|---|---|---|
| 2,511,971 | A |   | 6/1950 | Dalton |  |
| 2,737,852 | A | * | 3/1956 | Porter | B60R 1/0602 15/250.1 |
| 2,917,972 | A | * | 12/1959 | Bonaguro | B60R 1/064 359/873 |
| 3,337,177 | A | * | 8/1967 | Talbot | B60R 1/06 248/483 |
| 3,512,746 | A | * | 5/1970 | Vitaloni | B60R 1/06 D12/187 |
| 3,628,862 | A | * | 12/1971 | Stephenson | B60R 1/072 359/876 |
| 3,711,179 | A | * | 1/1973 | Takeda | B60R 1/0602 52/171.2 |
| 4,268,120 | A | * | 5/1981 | Jitsumori | B60R 1/10 248/483 |
| 4,538,851 | A |   | 9/1985 | Taylor |  |
| 4,626,085 | A | * | 12/1986 | Suzuki | G02B 7/1827 359/841 |

(Continued)

OTHER PUBLICATIONS

Torchinsky, J., "Up Close with the 'First' Rear-View Mirror and Two Secret Facts about It," Jalopnik, Aug. 10, 2015, https://jalopnik.com/up-close-with-the-first-rear-view-mirror-and-two-secret-1723111929.

(Continued)

*Primary Examiner* — Ricky D Shafer
(74) *Attorney, Agent, or Firm* — Vichit Chea; Carlson, Gaskey & Olds, P.C.

(57) ABSTRACT

A side view mirror assembly includes a base frame configured to couple to a bracket that is connected to a vehicle static structure. The base frame interfacing with the bracket through a guide that is at least partially received within a pocket when the base frame is coupled to the bracket. A mirror housing assembly is adjustably supported by the base frame.

16 Claims, 12 Drawing Sheets

(56) References Cited

U.S. PATENT DOCUMENTS

| | | | | |
|---|---|---|---|---|
| 4,836,491 | A * | 6/1989 | Fimeri | B60R 1/066 248/549 |
| 4,890,907 | A * | 1/1990 | Vu | B60Q 1/2665 359/865 |
| 5,124,846 | A * | 6/1992 | Seitz | B60R 1/074 359/843 |
| 5,268,795 | A * | 12/1993 | Usami | B60R 1/06 359/872 |
| 5,516,073 | A | 5/1996 | McMahan | |
| 5,889,624 | A * | 3/1999 | Dickenson | B60R 1/07 359/872 |
| 6,109,586 | A * | 8/2000 | Hoek | B60R 1/076 248/478 |
| 6,213,609 | B1 * | 4/2001 | Foote | B60R 1/078 359/881 |
| 6,220,716 | B1 * | 4/2001 | Asaka | B60R 1/06 359/872 |
| 6,441,943 | B1 * | 8/2002 | Roberts | F21S 43/14 359/522 |
| 6,672,726 | B1 * | 1/2004 | Boddy | B60R 1/078 359/872 |
| 6,811,288 | B2 | 11/2004 | Hutzel | |
| 7,267,384 | B1 | 9/2007 | Coviello | |
| 7,490,946 | B1 * | 2/2009 | Foote | B60R 1/06 248/478 |
| 8,336,845 | B1 * | 12/2012 | Courbon | B60R 1/076 359/872 |
| 8,517,331 | B2 * | 8/2013 | Roberts | B60R 1/06 359/872 |
| 9,180,816 | B2 * | 11/2015 | Dutton | B60R 1/04 |
| 9,221,398 | B1 * | 12/2015 | Englander | B60R 1/06 |
| 9,555,741 | B2 * | 1/2017 | Di Giusto | B60R 1/06 |
| 11,077,796 | B1 * | 8/2021 | Englander | B60R 1/0617 |
| 11,299,095 | B2 * | 4/2022 | Clarke | F16B 37/00 |
| 2002/0141085 | A1 * | 10/2002 | Whitehead | B60R 1/078 359/877 |
| 2004/0121820 | A1 * | 6/2004 | Unno | B60R 1/06 455/569.2 |
| 2009/0086346 | A1 * | 4/2009 | Henion | B60Q 1/2665 359/841 |
| 2012/0119053 | A1 * | 5/2012 | Sugisaka | B60R 1/06 248/479 |
| 2013/0148218 | A1 | 6/2013 | Schmidt | |
| 2014/0239143 | A1 | 8/2014 | Hernandez | |
| 2014/0268379 | A1 * | 9/2014 | Kelly | B60R 1/06 359/876 |
| 2016/0368419 | A1 * | 12/2016 | Toth | B60R 1/078 |
| 2018/0264999 | A1 | 9/2018 | Salter et al. | |
| 2021/0031692 | A1 * | 2/2021 | Ning | B60R 1/12 |
| 2021/0291741 | A1 * | 9/2021 | Wilson | B60R 1/078 |
| 2022/0080892 | A1 * | 3/2022 | Whipps | B62D 65/16 |

OTHER PUBLICATIONS

"E-Type Outside Mirrors," https://www.jaguarforums.com/forum/e-type-xk-e-59/e-type-outside-mirrors-147202/.

"1954 Chevy 3100 Pickup for Sale," ACM Classic Motorcars LLC, http://www.classicmotorcarsonline.com/1954-chevy-3100-pickup.shtml.

"For Sale: 1978 Toyota Land Cruiser FJ40 in O'Fallon, Illinois," https://classiccars.com/listings/view/1342060/1978-toyota-land-cruiser-fj40-for-sale-in-o-fallon-illinois-62269.

* cited by examiner

VEHICLE BODY STRUCTURE MOUNTED SIDE VIEW MIRROR

TECHNICAL FIELD

This disclosure relates to side view mirrors that are mounted to a vehicle body structure of a motor vehicle.

BACKGROUND

Vehicles include side view mirrors that are typically mounted to driver and passenger doors. Vehicles that are designed for off-road use often provide for the easy removal of doors. Removal of the doors can also result in removal of the side view mirrors.

SUMMARY

A side view mirror assembly for a vehicle according to one example disclosed embodiment includes, among other possible things, a base frame configured to couple to a bracket connected to a vehicle static structure, the base frame interfacing with the bracket through a guide at least partially received within a pocket when the base frame is coupled to the bracket and a mirror housing assembly adjustably supported by the base frame.

A further embodiment of the foregoing side view mirror assembly includes a bracket configured for attachment to the vehicle static structure, the base frame is mountable to the bracket and the bracket includes a boss extending from a flange, the boss seating directly to the vehicle static structure and spacing the flange from the vehicle static structure.

In a further embodiment of any of the foregoing side view mirror assemblies, the bracket includes the guide and the base frame includes the pocket, the pocket including inner surfaces that abut outer peripheral walls of the guide for fixing the base frame relative to vehicle static structure.

In a further embodiment of any of the foregoing side view mirror assemblies, the outer peripheral wall is a tapered wall and the inner surfaces of the pocket include a taper corresponding with the taper of the outer peripheral wall.

In a further embodiment of any of the foregoing side view mirror assemblies, at least one fastener secures the base frame to the bracket.

In a further embodiment of any of the foregoing side view mirror assemblies, at least one locator pin defines a position of the bracket relative to the vehicle static structure, the at least one locator pin extending from the flange.

In a further embodiment of any of the foregoing side view mirror assemblies, a seal assembly is attached to the bracket and disposed within a space between the flange and the vehicle static structure defined by the boss, the seal assembly including an expandable sealing material forming a seal between the vehicle static structure and the flange.

In a further embodiment of any of the foregoing side view mirror assemblies, the seal assembly includes a seal baffle and the seal material is disposed within the seal baffle, the seal baffle including at least one push pin extending through an opening in the bracket for securing the seal assembly to the bracket prior to attachment of the bracket to the vehicle static structure.

In a further embodiment of any of the foregoing side view mirror assemblies, the seal material comprises a nylon material and an expandable sealer material.

In a further embodiment of any of the foregoing side view mirror assemblies, the mirror housing assembly includes a mirror, a motor to adjust a position of the mirror and an electric conduit routed through the base frame to the motor.

In a further embodiment of any of the foregoing side view mirror assemblies, the mirror housing assembly includes at least one light and one additional electrical feature.

In a further embodiment of any of the foregoing side view mirror assemblies, the mirror housing assembly includes an arm pivotally attached to the base frame, the arm supporting the mirror and motor.

In a further embodiment of any of the foregoing side view mirror assemblies, the vehicle static structure comprises portions of an A-pillar.

A method of assembling a side view mirror to a vehicle according to another example embodiment of this disclosure includes, among other possible things, securing a bracket to a vehicle static structure, wherein securing the bracket includes seating a boss extending from a flange of the bracket directly onto a surface of the vehicle static structure, inserting a fastener through the boss, attaching the fastener to the vehicle static structure such that the flange is spaced apart from the vehicle static structure, attaching a base frame to the bracket and attaching a mirror housing assembly to the base frame where the mirror assembly adjustably supported on the base frame with an electric motor.

A further embodiment of the foregoing method includes attaching a seal assembly to the bracket prior to the bracket being secured to the vehicle static structure and heating the seal assembly to expand a sealing material within the space between the vehicle static structure and the flange of the bracket.

In a further embodiment of any of the foregoing methods, attaching the seal assembly to the bracket comprises inserting pins through openings within the bracket.

In a further embodiment of any of the foregoing methods, attaching the bracket to the vehicle static structure includes inserting at least one locating pin of the bracket into a corresponding alignment opening of the vehicle static structure.

In a further embodiment of any of the foregoing methods, attaching the base frame to the bracket by receiving a guide of the bracket into a pocket defined on the base frame.

In a further embodiment of any of the foregoing methods, the mirror housing assembly includes an arm that is pivotally coupled to the base frame.

A further embodiment of any of the foregoing methods includes routing at least one electric conduit through the base frame and arm.

The various features and advantages of this disclosure will become apparent to those skilled in the art from the following detailed description. The drawings that accompany the detailed description can be briefly described as follows.

DETAILED DESCRIPTION

Figure 1:
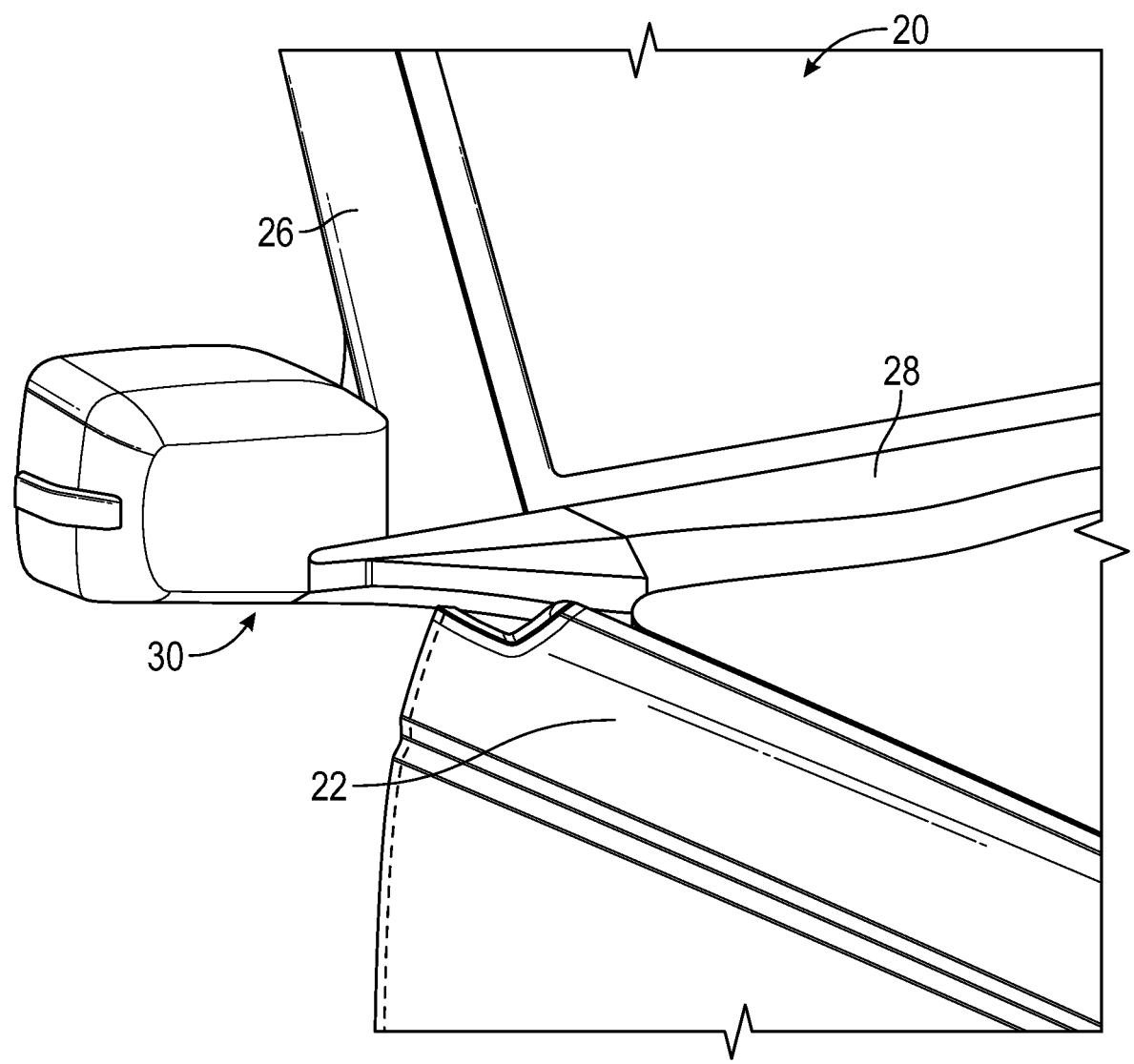
FIG. 1 is a perspective view of an example vehicle side view mirror assembly.
Figure 2:
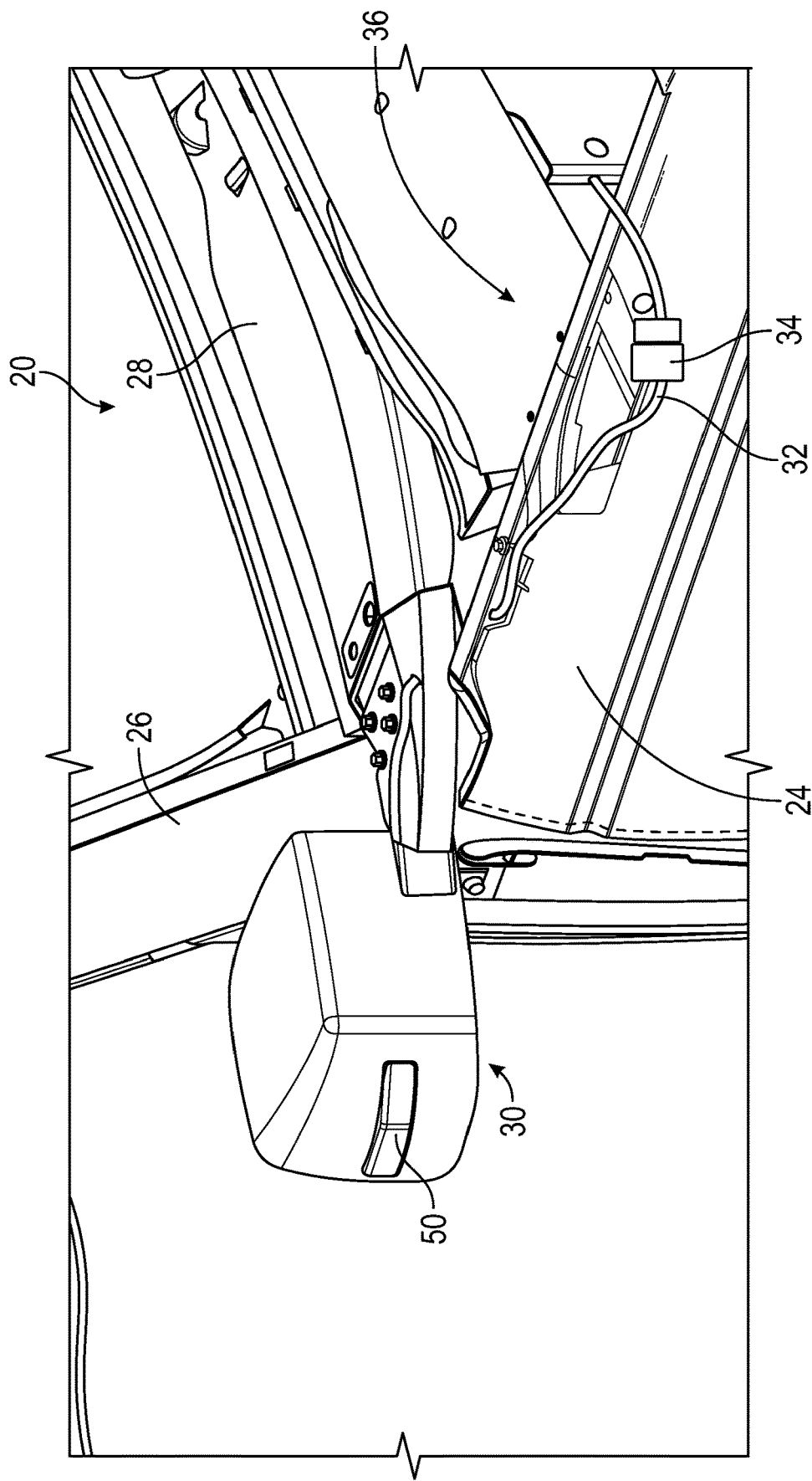
FIG. 2 is a partially cut-away view of the example vehicle side view mirror assembly.

FIGS. 1 and 2 illustrate a side view mirror assembly 30 for a motor vehicle 20. The side view mirror assembly 30 is mounted to a vehicle static structure 22 instead of a vehicle side door. The motor vehicle 20 may include doors that are removable to provide an open-air driving experience. Door mounted side view mirrors are of course removed with the doors. The example side view mirror assembly 30 may be mounted to structural vehicle body components within a leaf screen area 28. Accordingly, the side view mirror assembly 30 remains mounted to the vehicle 20 even when side doors of the vehicle 20 are removed.

Figure 3:
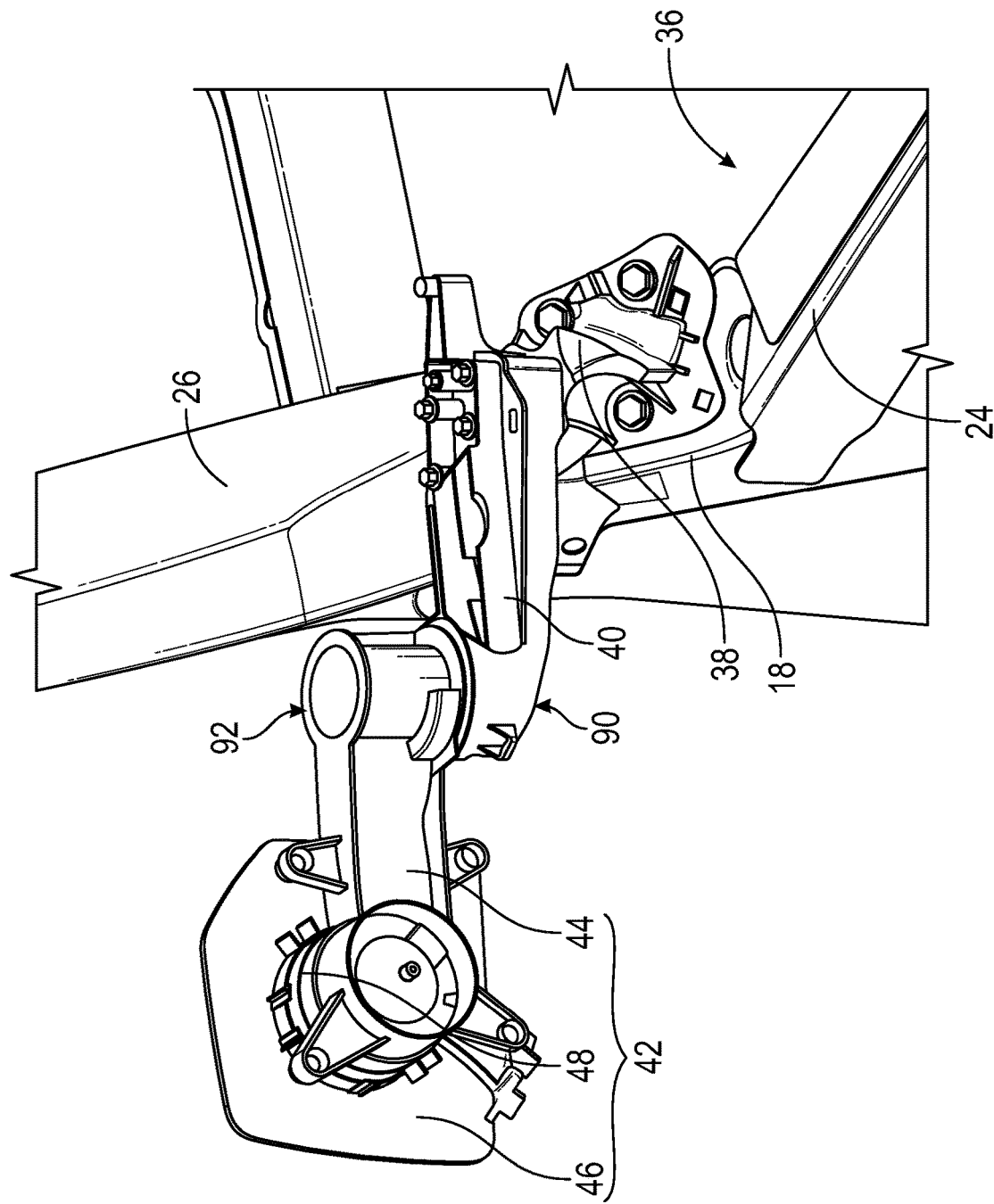
FIG. 3 is another view of the example side view mirror assembly.

Referring to FIG. 3, with continued reference to FIGS. 1 and 2, the vehicle static structure 22 may include portions of the vehicle A-pillar 26 and a hinge pillar 18 (FIG. 3). A bracket 38 is mounted to the vehicle static structure and supports a base frame 40 and mirror housing assembly 42 of the side view mirror assembly 30. The mirror housing assembly 42 includes an arm 44 that supports a motor 48 and mirror 46.

An electric conduit 32 is routed through the base frame 40 and into a dry area 36. A connector 34 attached the conduit 32 is attached to applicable power and control conduits to power and control the motor 48 for adjusting a position of the mirror 46. The arm 44 includes a pivot portion 92 pivotally mounted to a pivot 90 of the base frame 40. In the exemplary embodiment, the pivot portion 92 is an integral part of the arm 44 and the pivot 90 is an integral part of the base frame 40. It is within the contemplation of this disclosure that parts of the arm 44 and base frame 40 may be differently configured with separate parts.

In one disclosed embodiment, the mirror assembly 30 may include an electrical feature such as, for example, a light 50. In one example, the light 50 is a turn signal lamp. The light 50 is shown by way of example and other lighting features could also be included in the mirror assembly 30, such as for example a spot light or blind spot information system light may also be included and are within the contemplation and scope of this disclosure. The mirror assembly 30 may include other electrical features such as, for example, a mirror defroster, puddle lamp, turn signal and/or any other electrical feature complementing operation of the vehicle and mirror assembly 30. The mirror assembly 30 may include only the mirror without a light and such an embodiment is also within the contemplation and scope of this disclosure.

The disclosed mirror assembly 30 may be attached to the vehicle static structure 22 at a joint interface between the A-pillar 26 and the hinge pillar 18. The joint interface is sealed to prevent water from entering into the dry area 36 as well as the vehicle passenger cabin. The dry area 36, in this disclosed example, is under the mirror bracket 38 and may include components and electrical wiring that are purposely shielded from the ambient environment. The example mirror assembly 30 may be attached to other locations of the vehicle static structure 22, such as entirely on either of the A-pillar or the hinge pillar 18. Moreover, although example parts of the vehicle static structure are disclosed by way of example, the mirror assembly may be attached to any portion of the vehicle static structure.

Figure 4:
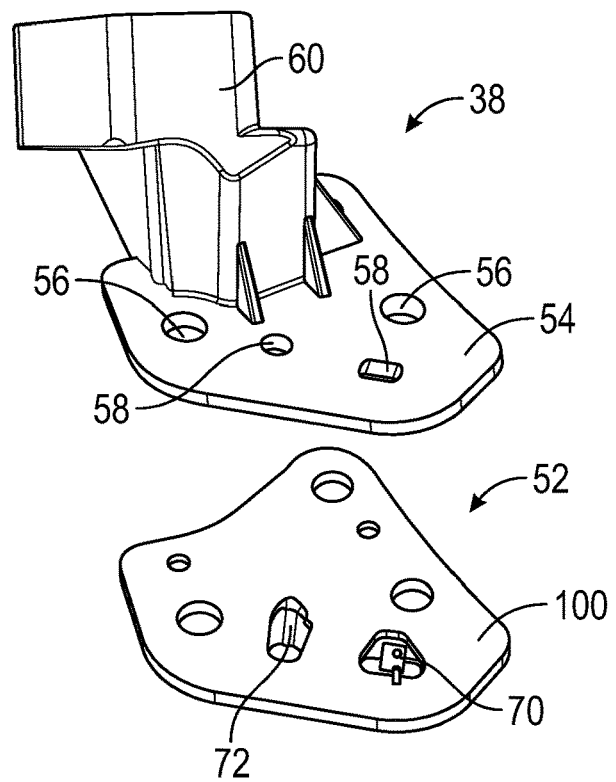
FIG. 4 is a perspective view of an example bracket and seal.
Figure 5:
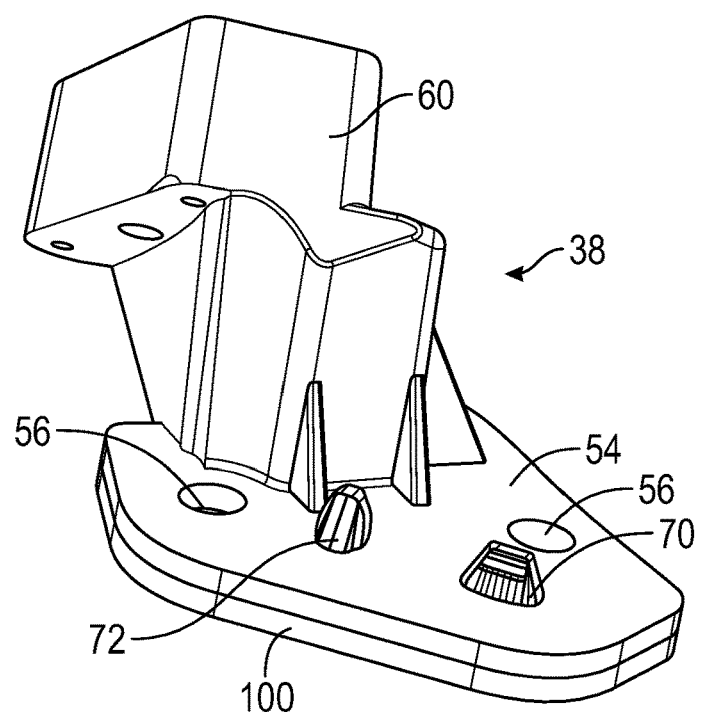
FIG. 5 is a perspective view of the example seal assembled to the bracket.
Figure 6:
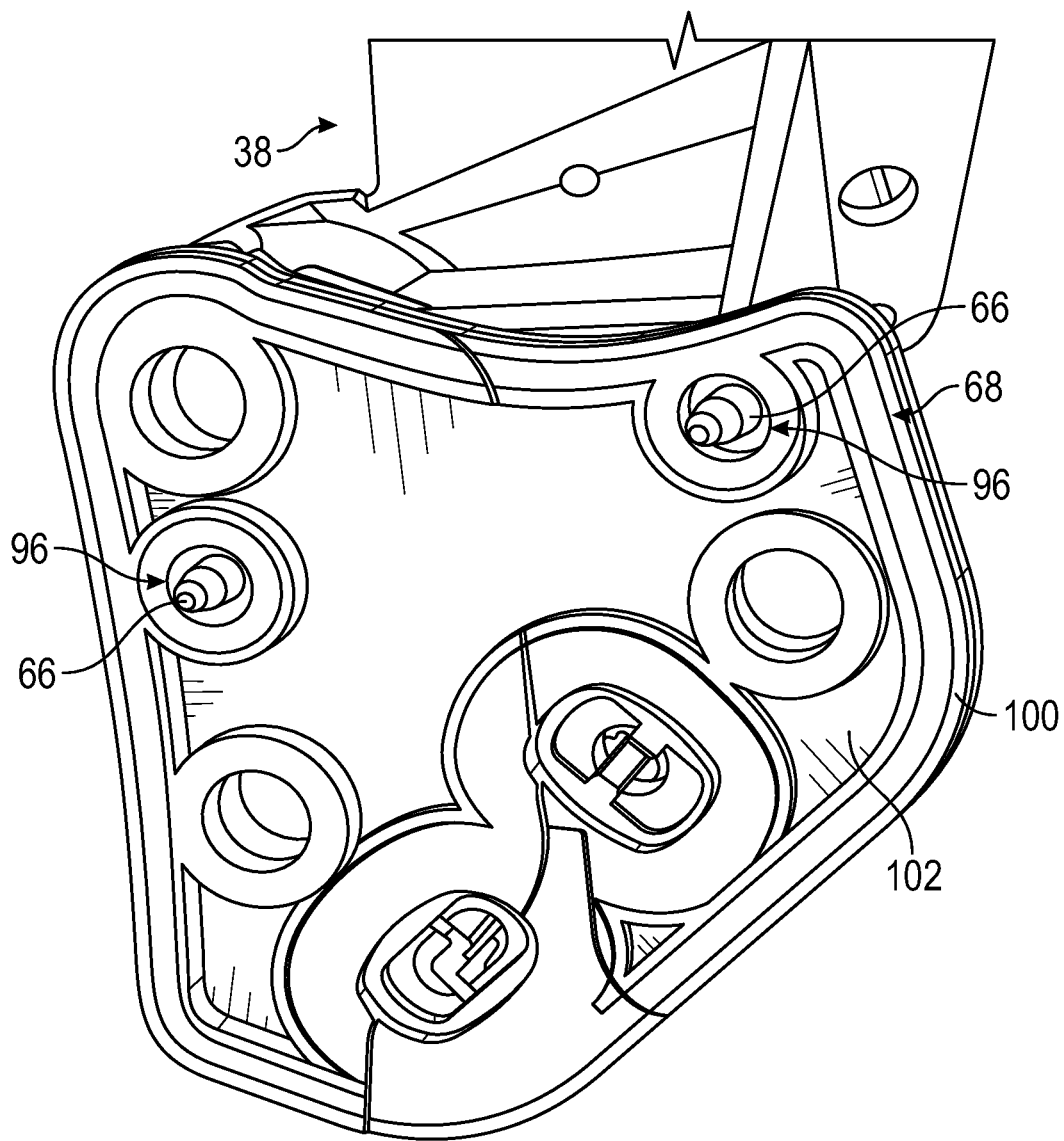
FIG. 6 is a bottom view of the example seal assembled to the bracket.

Referring to FIGS. 4, 5 and 6, a seal assembly 52 may be assembled to the bracket 38 to seal over the joint interface. In the exemplary embodiment, the seal assembly 52 includes a seal material 102 supported by a seal baffle 100. The seal material 102 is fabricated from a compliant material that conforms to the vehicle static structure 22 to provide sealing against the ambient environment. In one disclosed example environment, the seal material 102 is formed from a nylon 6-6 material. The example material may also be heat reactive and may expand upon exposure to heat. Heat may be provided by exposure in an electrocoat oven during the vehicle painting process. The expansion in the presence of heat occurs after installation such that the seal material 102 conforms to the unique application specific contours of the vehicle static structure. Other sealing materials may also be utilized and are within the contemplation of this disclosure.

The seal baffle 100 is shaped to correspond with a shape of a flange 54 of the bracket 38. The flange 54 includes openings 56 for fasteners utilized to secure the bracket 38 to the vehicle structure. The flange 54 further includes openings 58 that receive push pins 70, 72 of the seal baffle 100. The push pins 70, 72 extend through corresponding ones of the openings 58 to hold the seal baffle 100 to the bracket 38 during assembly. In this example, each of the push pins 70, 72 includes a snap fit configuration that engages the top side of the flange 54 once inserted through a corresponding opening 58. In this example, the push pin 72 is shaped differently from the push pin 70. The differently shaped push pins 70, 72 provide an assurance that the seal assembly 52 will be properly orientated and assembled to the bracket 38. Identical shaped push pins 70, 72 are also within the scope and contemplation of this disclosure.

Peripheral ribs 68 extend about the outer perimeter of the seal baffle 100 as shown in FIG. 6. The bracket 38 includes locator pins 66 that extend from the underside of the flange 54 and through corresponding openings 96 in the seal baffle 100. The locator pins 66 provide for positioning of the bracket 38 relative to the vehicle static structure. The pins 66 may be identically configured and shaped, or may be differently shaped depending on the needs for positioning on the vehicle static structure.

The bracket 38 includes a guide 60 that extends from the flange 54 and defines the interface for assembly of the base frame 40. Once assembled to the vehicle static structure, the bracket 38 is not removed. Accordingly, the bracket 38 may serve as a mounting location of alternate features. The guide 60 defines a mating structure to which the mirror assembly 30 is assembled. Alternatively, the mirror assembly 30 may be removed and the guide 60 utilized to mount accessory items, such as a light and/or camera, for example.

Figure 7:
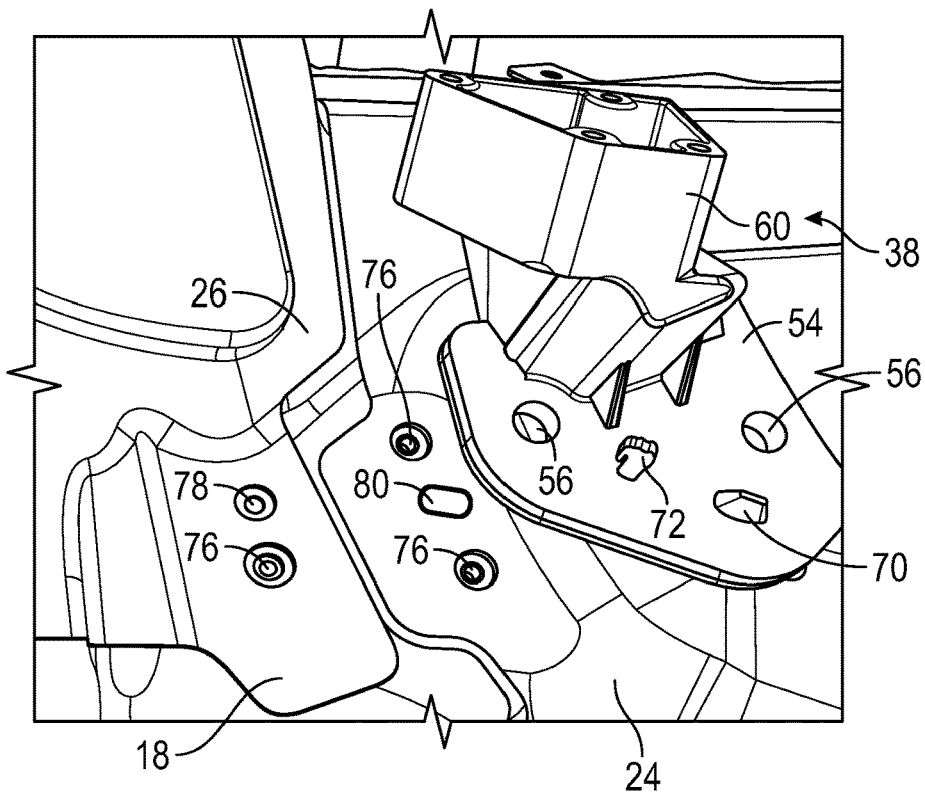
FIG. 7 is a perspective view of the example bracket and a portion of the vehicle static structure.
Figure 8:
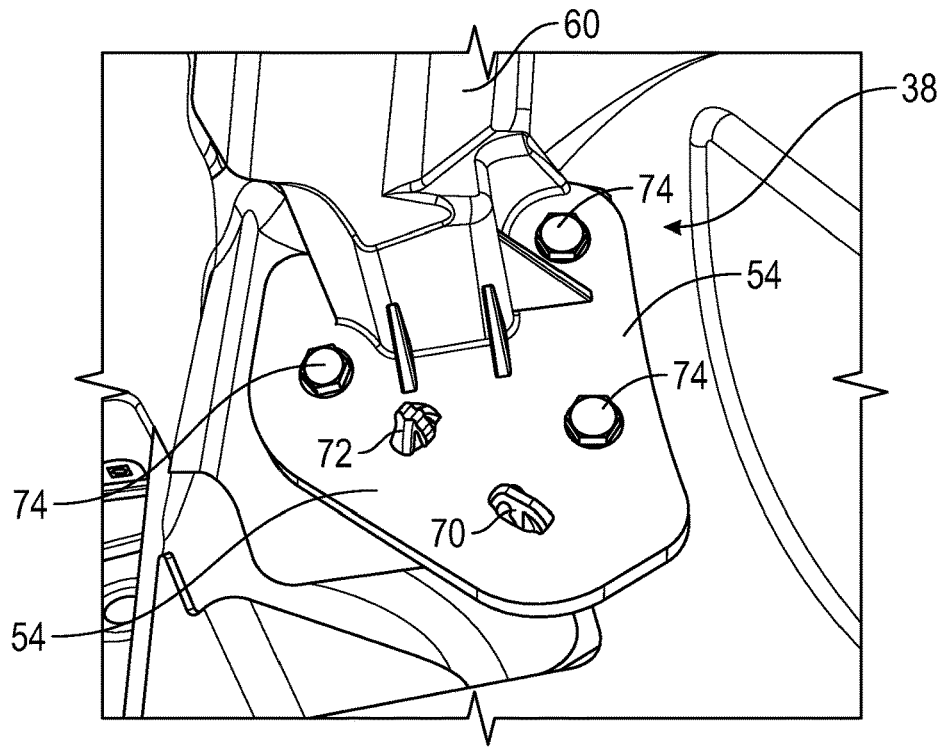
FIG. 8 is a perspective view of the bracket assembled to the vehicle static structure.
Figure 9:
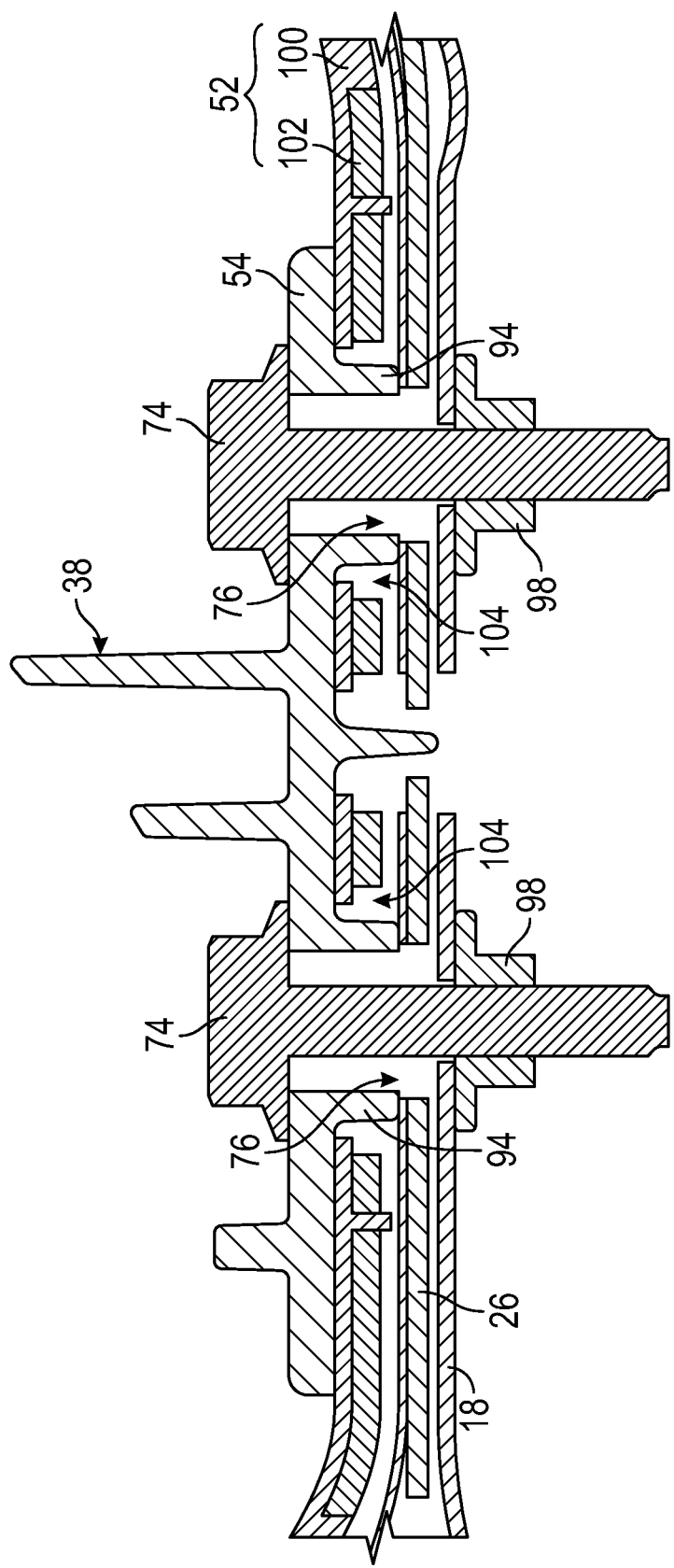
FIG. 9 is a cross-sectional view of the flange of the base frame secured to the vehicle static structure.

Referring to FIGS. 7, 8 and 9, the flange 54 includes openings 56 for fasteners 74 that are utilized to secure the bracket 38 to a fixed vehicle static structure. Bosses 94 (two shown in FIG. 9) extend from the flange 54 about the openings 56 and seat directly on the vehicle structure. Although only two bosses 94 are shown, each of the openings 56 for the fasteners 74 include a boss 94 to provide for direct seating contact to the vehicle structure. The direct seating of the bosses 94 at the location of each of the fasteners 74 provides a rigid metal to metal mounting contact. The seal assembly 52 fits around each of the bosses 94 to provide the desired seal without interfering with the rigid metal to metal mounting contact. The seal baffle 100 includes openings 104 through which the corresponding boss 94 extends to seat on the fixed vehicle structure. In this example, the vehicle structure is part of the hinge pillar 18, the A-pillar 26 and the fender support 24.

The bracket 38 and seal assembly 52 are shown along with portions of the A-pillar 26, the hinge pillar 18, and the fender support 24. Threaded openings 76 are provided to receive fasteners 74. The example threaded openings 76 are formed with nuts 98 that are attached to an underside of the vehicle static structure. In this example, the nuts 98 are welded in place.

Locating openings 78 and 80 are also provided to receive the locator pins 66. The opening 80 is a slot that provides positive location in two directions along a common axis. The opening 78 is a round opening that corresponds to the size of the corresponding locator pin 66. The opening 78 provides for an orientation in four directions along transverse axes.

The bracket 38 is mounted to the vehicle static structure by inserting the locator pins 66 in corresponding locator openings 78, 80. The seal assembly 52 is attached to the bottom of the flange 54 and secured in place by tabs 70 and 72 prior to assembly to the vehicle static structure. The direct metal to metal contact provided by the bosses 94 around each fastener provides a rigid foundation directly attached to the vehicle static structure for the mirror assembly or other accessory devices.

Figure 10:
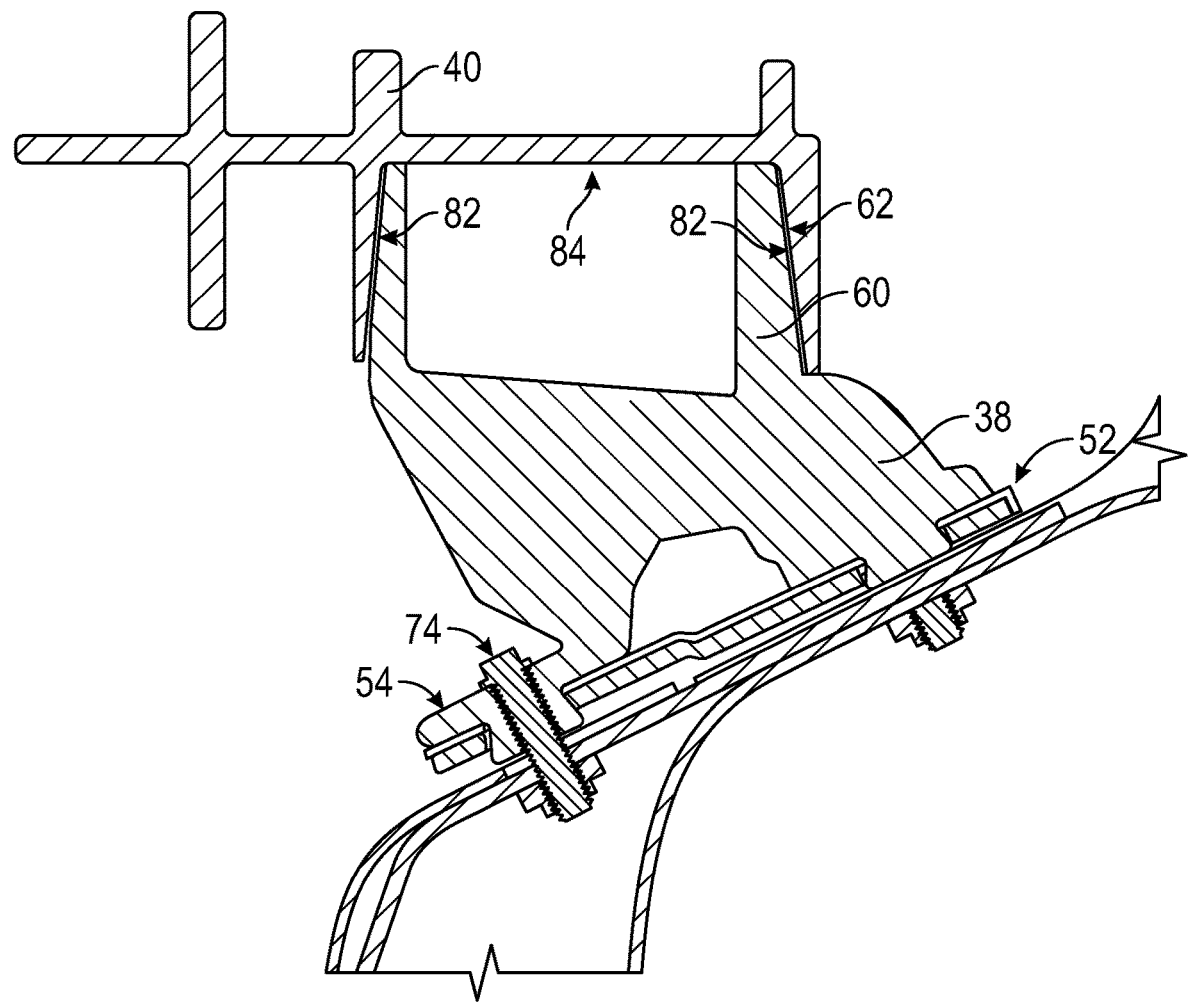
FIG. 10 is a cross-sectional view of an example base frame assembled to the bracket.

Referring to FIG. 10 with continued reference to FIGS. 8 and 9, the guide 60 includes an outer peripheral wall 62 that is received within a pocket 84 defined by the base frame 40. The pocket 84 includes inner surfaces 82 that abut against the outer peripheral wall 62 and may include a slight taper to further align and provide a rigid interface with the outer peripheral wall 62 of the bracket 38. The outer peripheral wall 62 may include a taper corresponding with the taper on the inner surfaces 82 of the pocket 84. The corresponding tapers provide a line on line abutting contact that maintains alignment and rigid fixed orientation. The abutted relationship between the surface 82 and the wall 62 orientates the base frame 40 to the bracket 38 and thereby the vehicle static structure 22. FIG. 10 shows only a portion of the base frame 40. It should be appreciated that although the disclosed guide 60 is provided for securement of the mirror assembly 30, because the bracket 38 remains on the vehicle static structure, other accessory devices could be mounted to the bracket 38 and are within the contemplation and scope of this disclosure. Moreover, the pocket 84 and guide 60 may be reversed such that the base frame 40 includes a guide and the bracket 38 includes a pocket.

Figure 11:
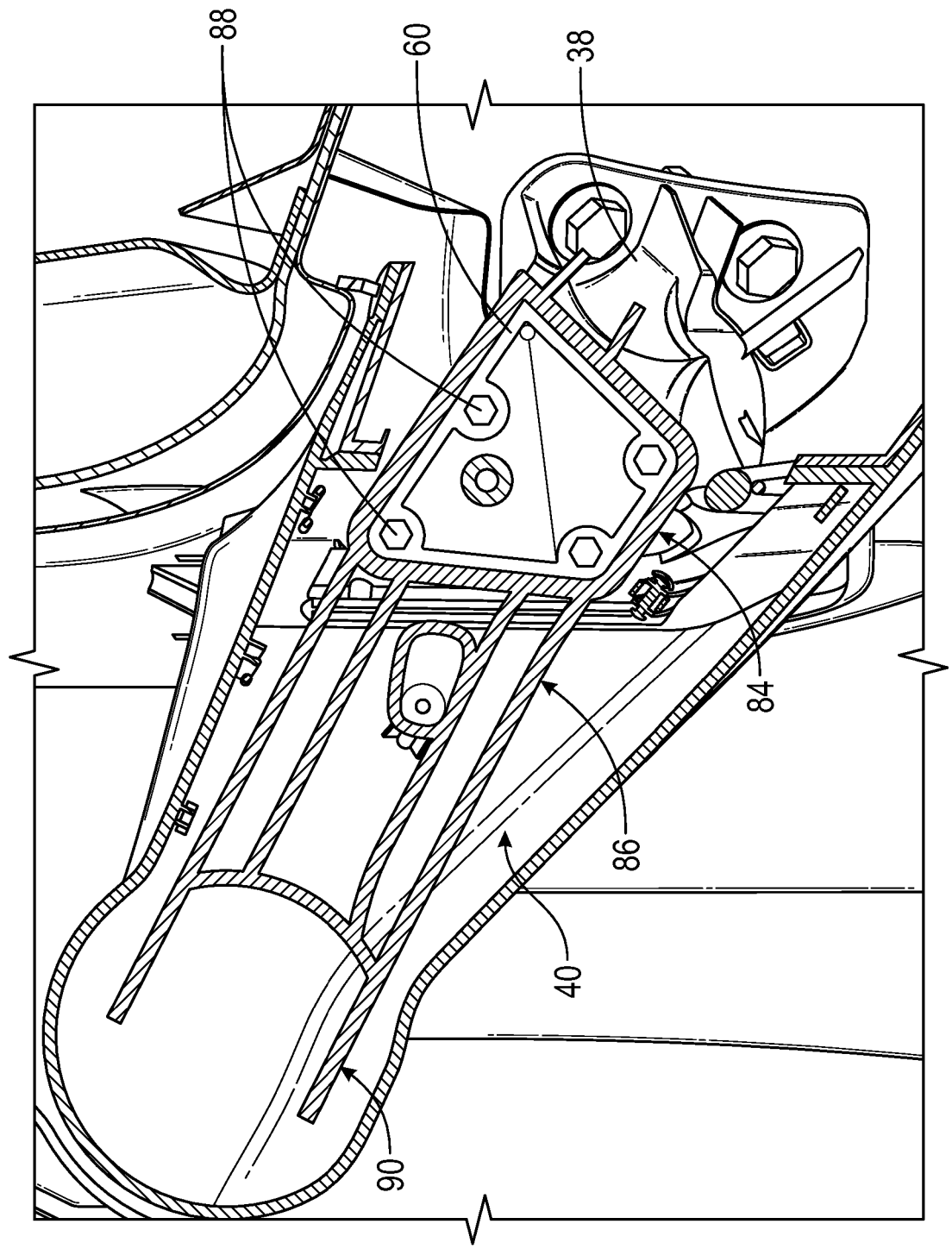
FIG. 11 is a top view of the base frame attached to the bracket.
Figure 12:
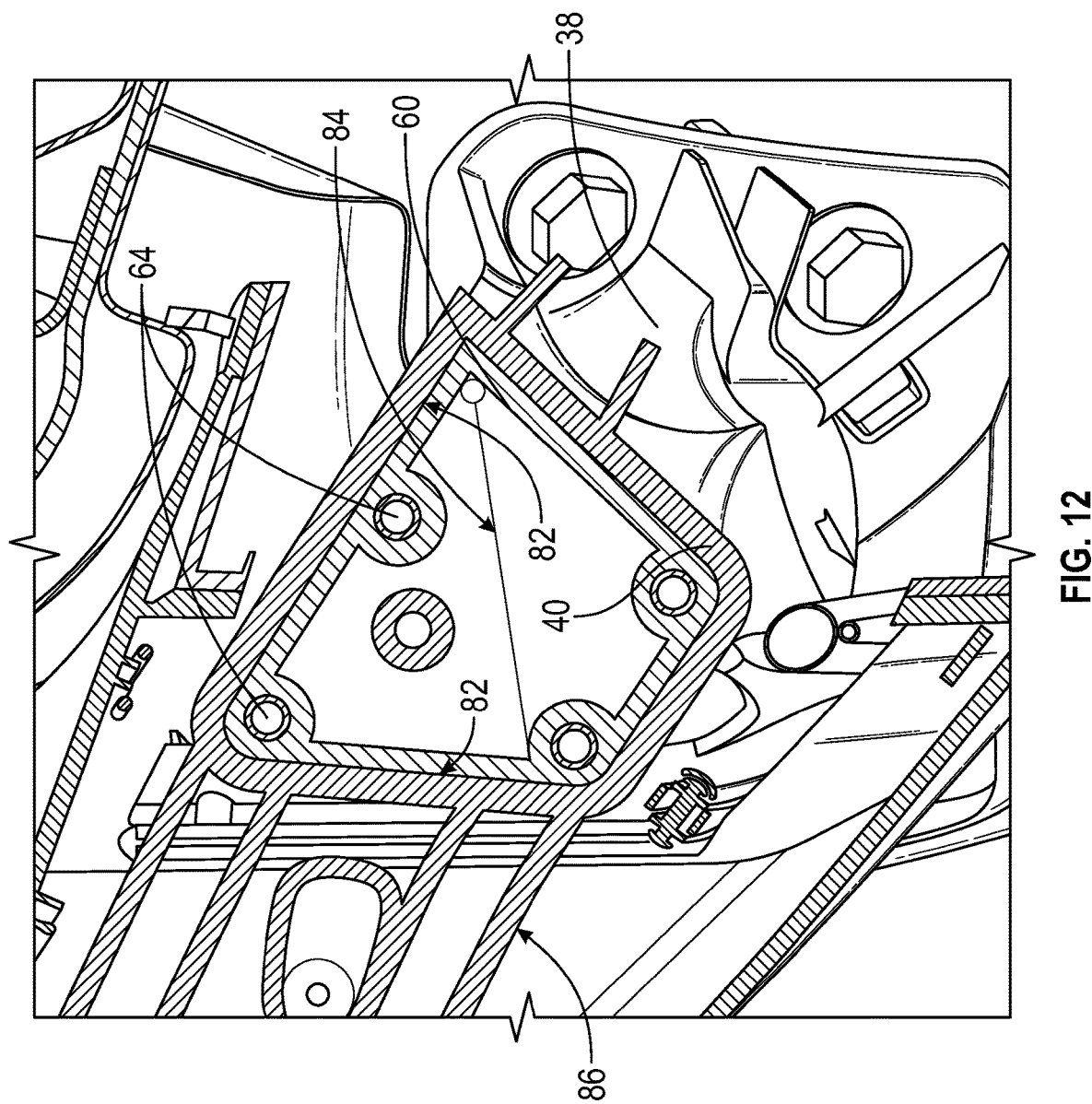
FIG. 12 is an enlarged view of a portion of the base frame attached to the bracket.

Referring to FIGS. 11 and 12 with continued reference to FIGS. 9 and 10, the guide 60 includes openings 64 for receiving fasteners 88 that secure the base frame 40 to the bracket 38. The openings 64 in this embodiment are not threaded, and the fasteners 88 are thread forming fasteners that create threads when inserted into the corresponding openings 64. However, the openings 64 could alternatively be threaded to enable mounting of other accessory devices.

The base frame 40, and thereby the mirror assembly 30, may be removed from the bracket 38 for service if needed. Accordingly, should removal of the mirror housing assembly 42 (FIG. 3) be required for maintenance or service, the seal between the bracket 38 and the vehicle static structure is not disturbed. The example base frame 40 includes the extension 86 that extends from the pocket 84 to the pivot support portion 90. The pivot portion 92 on the arm 44 of the mirror assembly 42 attaches to the portion 90 (FIG. 3).

Figure 13:
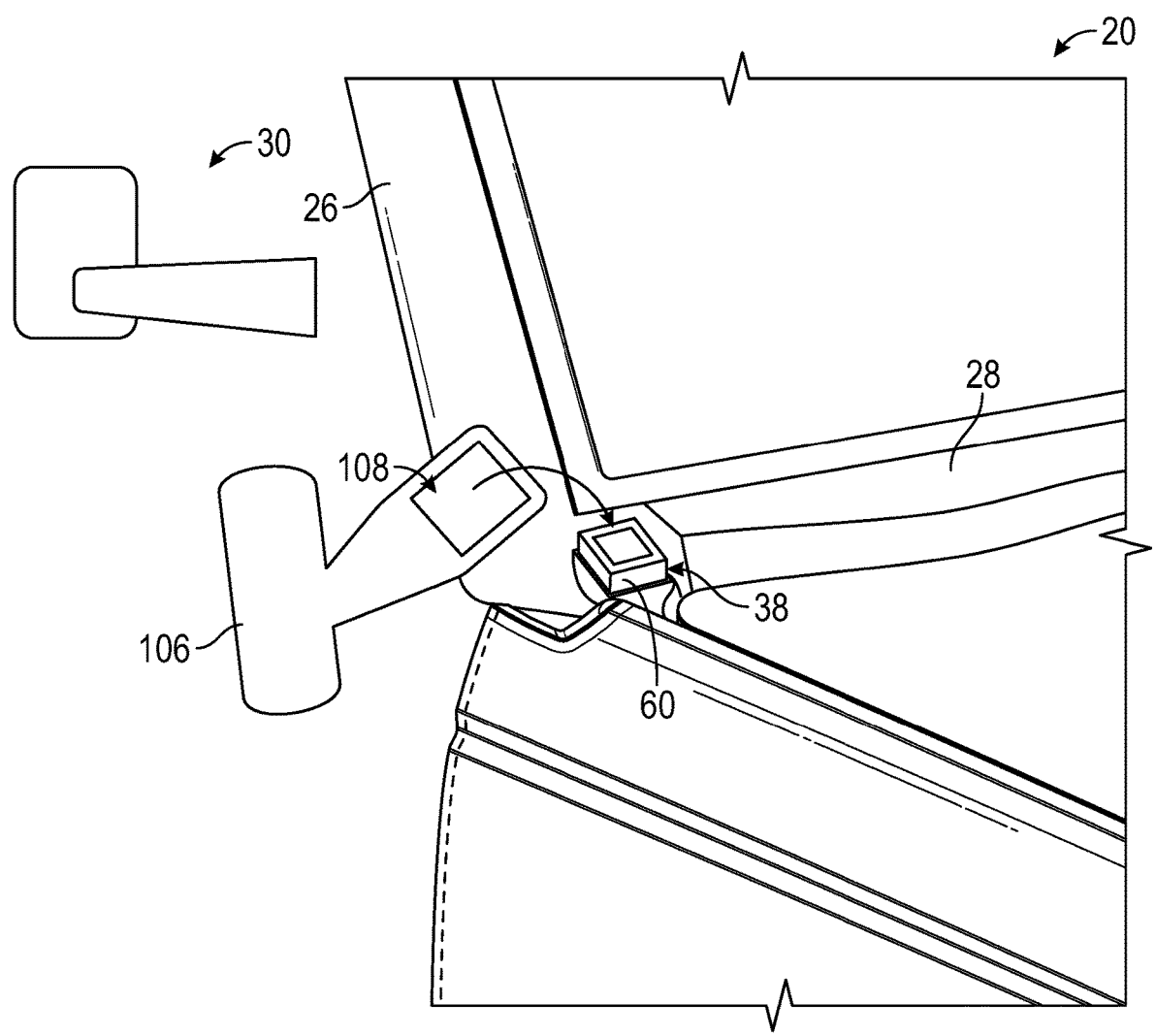
FIG. 13 is a schematic view with the side view mirror assembly removed and an accessory item being installed.

Referring to FIG. 13, the guide 60 defined on the bracket 38 provides a common mounting configuration that can support an accessory item that includes a pocket configured to receive the guide 60. The guide 60 therefore provides a mounting location for supporting accessory devices such as additional lights, cameras, cargo carriers or any other structure provided with a correspondingly configured pocket.

In one disclosed example, an accessory item 106 includes a pocket 108 that receives the guide 60 of the bracket 38. The mirror assembly 30 is detached from the bracket 38 and stored for later reinstallation and use.

Figure 14:
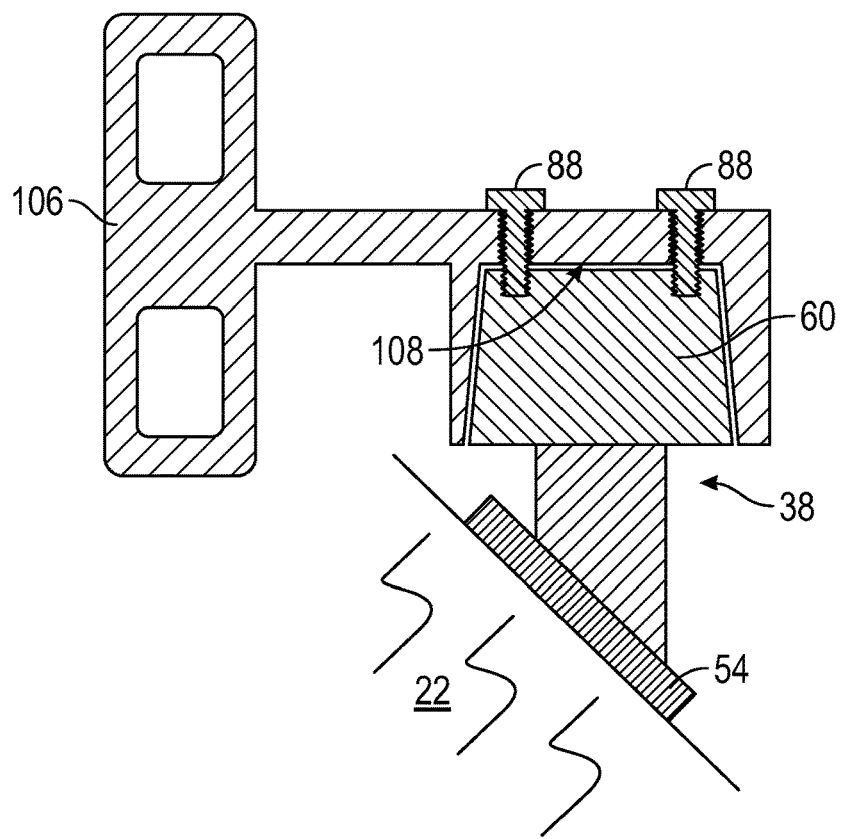
FIG. 14 is a schematic view of an accessory item secured to the example bracket.

Referring to FIG. 14 with continued reference to FIG. 13, the example accessory item 106 is a light that is attached to the bracket 38 by way of the interface between the guide 60 and pocket 108. Fasteners 88 extend through the accessory item 106 and are received within corresponding openings in the guide 60.

Figure 15:
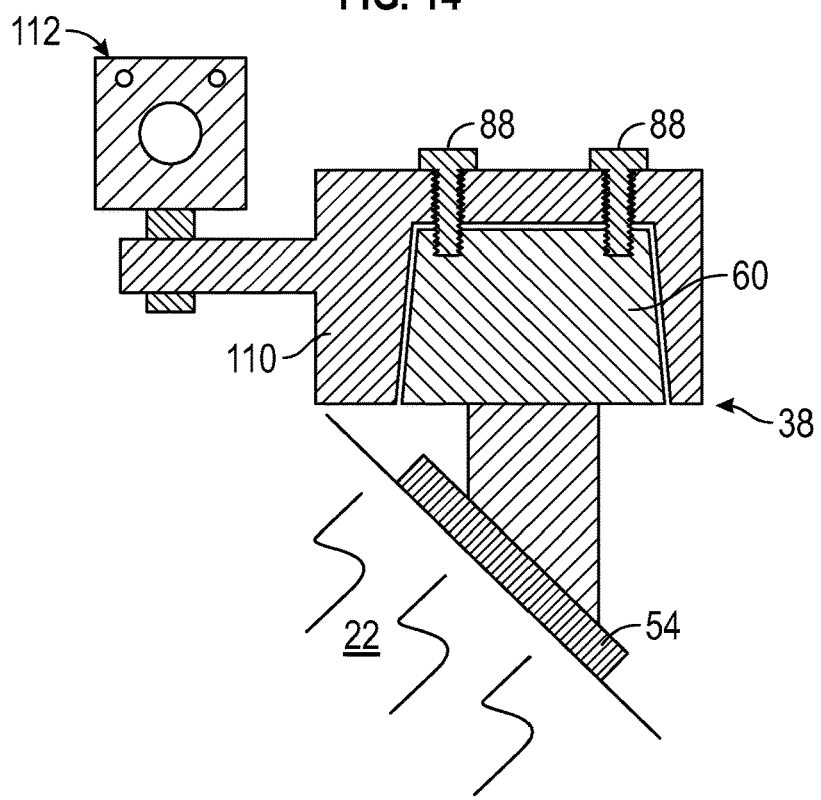
FIG. 15 is a schematic view of another accessory item secured to the example bracket.

Referring to FIG. 15, another accessory item is a mount 110 for a camera 112. The mount 110 includes the mating pocket 108 for receiving the guide 60. The example mount 110 could be utilized for accessory devices other than the example camera 112. Moreover, any structure for a light, camera or mount may be equipped with a pocket 108 for mounting to the example bracket 38.

Accordingly, the bracket 38 enables for permanent sealing to the vehicle static structure while the interface with the base frame 40 provides for removal of the mirror assembly 30 for replacement or maintenance. The bracket 38 further provides increased stability with the direct metal to metal contact with the vehicle static structure.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A side view mirror assembly for a vehicle comprising:
a bracket configured for attachment to a vehicle static structure, the bracket includes a boss extending from a flange, the boss seating directly to the vehicle static structure and spacing the flange from the vehicle static structure;
a base frame configured to couple to the bracket, the base frame interfacing with the bracket through a guide that is at least partially received within a pocket when the base frame is coupled to the bracket, wherein in the base frame is spaced apart from the vehicle static structure and the flange of the bracket when coupled to the bracket; and a mirror housing assembly adjustably supported by the base frame wherein the mirror housing assembly includes a mirror, a motor to adjust a position of the mirror, an electric conduit routed through the base frame to the motor and an arm pivotally attached to the base frame with the arm supporting the mirror and the motor.

2. The side view mirror assembly as recited in claim 1, wherein the bracket includes the guide and the base frame includes the pocket, the pocket including inner surfaces that abut outer peripheral walls of the guide for fixing the base frame relative to the vehicle static structure.

3. The side view mirror assembly as recited in claim 2, wherein the outer peripheral wall is a tapered wall and the inner surfaces of the pocket include a taper corresponding with the taper of the outer peripheral wall.

4. The side view mirror assembly as recited in claim 1, including at least one fastener securing the base frame to the bracket.

5. The side view mirror assembly as recited in claim 1, including at least one locator pin defining a position of the bracket relative to the vehicle static structure, the at least one locator pin extending from the flange.

6. The side view mirror assembly as recited in claim 1, wherein the mirror housing assembly includes at least one light and one additional electrical feature.

7. A side view mirror assembly for a vehicle comprising:
   a bracket configured for attachment to a vehicle static structure, the bracket includes a boss extending from a flange, the boss seating directly to the vehicle static structure and spacing the flange from the vehicle static structure;
   a base frame configured to couple to the bracket, the base frame interfacing with the bracket through a guide that is at least partially received within a pocket when the base frame is coupled to the bracket;
   a mirror housing assembly adjustably supported by the base frame;
   at least one locator pin defining a position of the bracket relative to the vehicle static structure, the at least one locator pin extending from the flange; and
   a seal assembly attachable to the bracket and disposed within a space between the flange and the vehicle static structure defined by the boss, the seal assembly including an expandable sealing material forming a seal between the vehicle static structure and the flange.

8. The side view mirror assembly as recited in claim 7, wherein the seal assembly includes a seal baffle and the sealing material is disposed within the seal baffle, the seal baffle including at least one push pin extending through an opening in the bracket for securing the seal assembly to the bracket prior to attachment of the bracket to the vehicle static structure.

9. The side view mirror assembly as recited in claim 7, wherein the sealing material comprises a nylon material and an expandable sealer material.

10. A side view mirror assembly for a vehicle comprising:
    a bracket configured for attachment to a vehicle static structure, the bracket includes a boss extending from a flange, the boss seating directly to the vehicle static structure and spacing the flange from the vehicle static structure;
    a base frame configured to couple to the bracket, the base frame interfacing with the bracket through a guide that is at least partially received within a pocket when the base frame is coupled to the bracket, wherein the base frame is spaced apart from the vehicle static structure and the flange of the bracket when coupled to the bracket; and
    a mirror housing assembly adjustably supported by the base frame, wherein the vehicle static structure comprises portions of an A-pillar.

11. A method of assembling a side view mirror to a vehicle comprising:
    attaching a seal assembly to a bracket prior to the bracket being secured to a vehicle static structure;
    securing the bracket to the vehicle static structure, wherein securing the bracket includes seating a boss extending from a flange of the bracket directly onto a surface of the vehicle static structure, inserting a fastener through the boss, and attaching the fastener to the vehicle static structure such that the flange is spaced apart from the vehicle static structure;
    heating the seal assembly to expand a sealing material within the space between the vehicle static structure and the flange of the bracket;
    attaching a base frame to the bracket; and
    attaching a mirror housing assembly to the base frame, the mirror assembly adjustably supported on the base frame with an electric motor.

12. The method as recited in claim 11, wherein attaching the seal assembly to the bracket comprises inserting pins through openings within the bracket.

13. The method as recited in claim 11, wherein attaching the bracket to the vehicle static structure includes inserting at least one locating pin of the bracket into a corresponding alignment opening of the vehicle static structure.

14. The method as recited in claim 11, including attaching the base frame to the bracket by receiving a guide of the bracket into a pocket defined on the base frame.

15. The method as recited in claim 14, wherein the mirror housing assembly includes an arm that is pivotally coupled to the base frame.

16. The method as recited in claim 11, including routing at least one electric conduit through the base frame and an arm.

* * * * *